July 2, 1963   H. PENDORF   3,095,612
APPARATUS FOR MAKING CONDUIT
Original Filed Nov. 2, 1956   4 Sheets-Sheet 1

INVENTOR.
HAROLD PENDORF
BY
Bauer and Seymour
ATTORNEYS

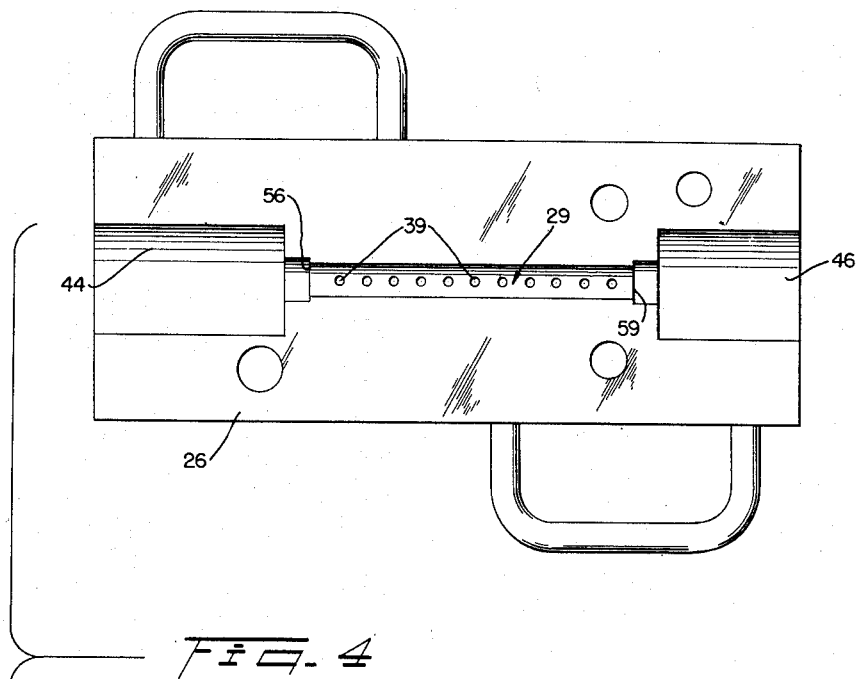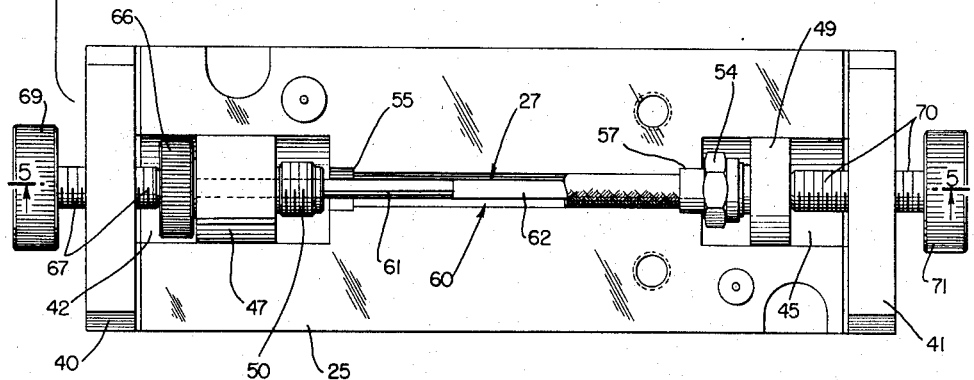

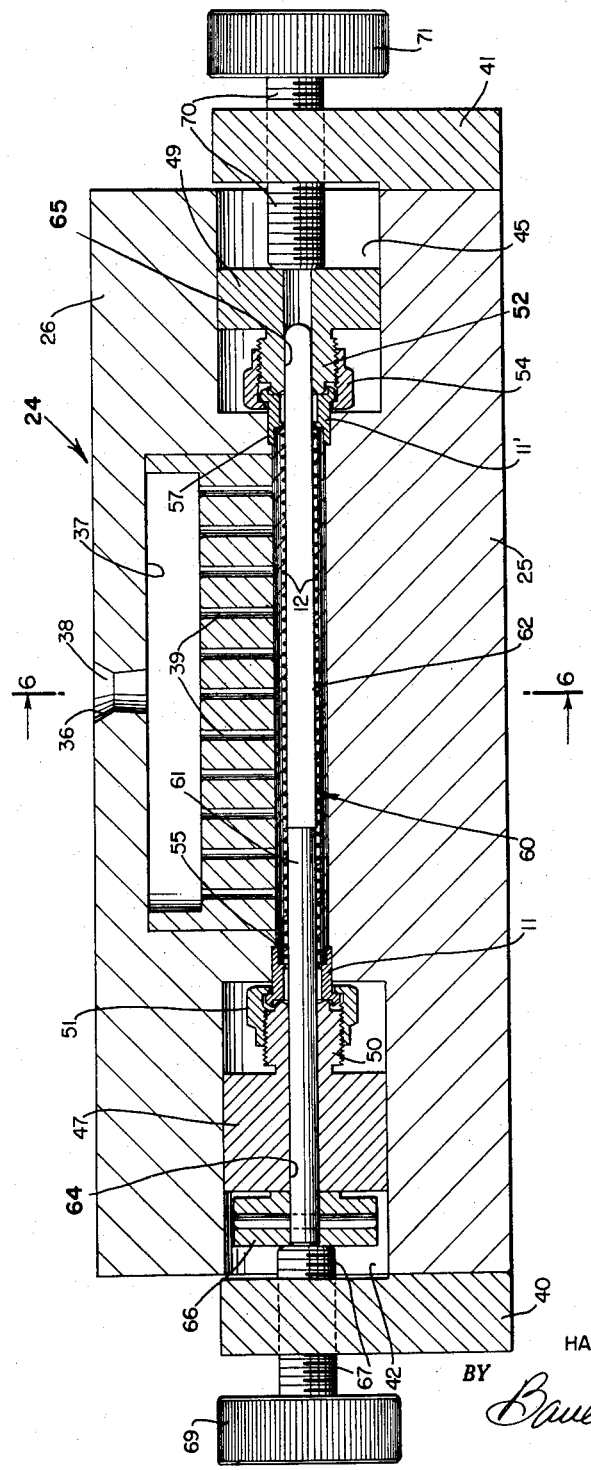

July 2, 1963 H. PENDORF 3,095,612
APPARATUS FOR MAKING CONDUIT
Original Filed Nov. 2, 1956 4 Sheets-Sheet 4

INVENTOR.
HAROLD PENDORF
BY
ATTORNEYS

United States Patent Office 3,095,612
Patented July 2, 1963

3,095,612
APPARATUS FOR MAKING CONDUIT
Harold Pendorf, Sidney, N.Y., assignor to The Bendix Corporation, a corporation of Delaware
Original application Nov. 2, 1956, Ser. No. 620,023, now Patent No. 2,981,982, dated May 2, 1961. Divided and this application Jan. 15, 1960, Ser. No. 2,633
3 Claims. (Cl. 18—36)

This invention relates to apparatus for the treatment of a porous-walled flexible conduit, such as a crush-proof flexible metal radio-shielding conduit and the like. More particularly, the invention relates to apparatus for impregnating the walls of such conduit with flexible non-porous materials.

This application is a division of application Serial No. 620,023, filed November 2, 1956, now Patent No. 2,981,-982, issued May 2, 1961.

One of the objects of the present invention is to provide a novel apparatus for impregnating porous-walled tubes.

Another object of the invention is to provide an improved apparatus for impregnating tubes of the indicated character such tubes having one or more layers therein which initially are prone to displacement longitudinally of the conduit.

A further object is to provide an improved apparatus for impregnating porous-walled tubes having one or more layers composed of one or more initially axially displaceable members by introducing impregnating compound to the tube in such manner as not substantially to disturb the initial spacing of the displaceable members.

Yet another object of the invention is to provide an improved apparatus for making an impregnated flexible conduit, one inner layer of which is formed by a helically wound wire, the turns of which are spaced substantially uniformly along the length of the conduit.

A still further object is to provide an improved simplified mold in which the conduit is positioned during the described impregnating operation, said mold including novel gating means, novel means for sealing the ends of the conduit to the walls of the mold cavity, and novel means for mounting a conduit bore-defining mandrel in the mold cavity.

The above and further objects and novel features of the invention will more fully appear from the following detailed description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views, FIG. 1 is a view in elevation of a typical flexible conduit which may be treated in accordance with the invention, a central portion of the conduit being broken away, the tubes making up the portion of the conduit wall shown at the left being progressively peeled or cut away;

FIG. 4 is a view in plan of the upper and lower parts of an embodiment of mold, useful in carrying out the method of the invention, the upper mold part having been lifted from the lower mold part and turned upside down;

FIG. 5 is a view in vertical longitudinal axial section through the mold of FIG. 4 with the conduit being treated shown as positioned therein;

The embodiment of the conduit illustrated in the accompanying drawings, by way of example, is in the form of a composite flexible metal walled tube which is useful, for example, as a shield for conductors in the ignition system of an internal combustion engine. When the metal wall of the conduit is properly grounded, it forms an effective shield against the radiation of electromagnetic vibrations, set up by the ignition system, which would otherwise interfere with radio communication. The conduit shown is of the type which strongly resists crushing forces, thereby insuring that the conductor contained within it will not be injured in spite of rough handling of the conduit. When the conduit is employed with an airplane engine it is, of course, also subjected to extremely adverse conditions including vibration by wind current and engine operation, exposure to extremes of high and low temperatures, electrical corona, grease, oil, and moisture, as well as wide variations in altitude.

Figure 1:
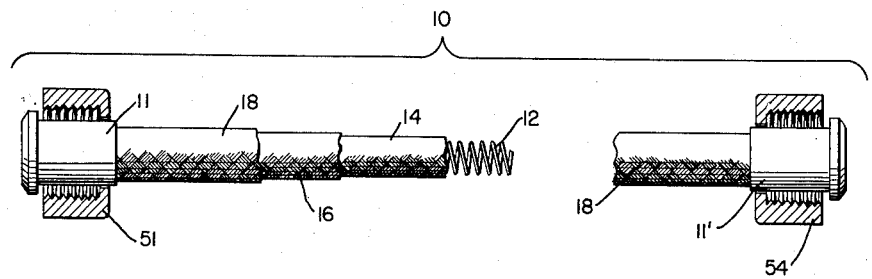
Figure 2:
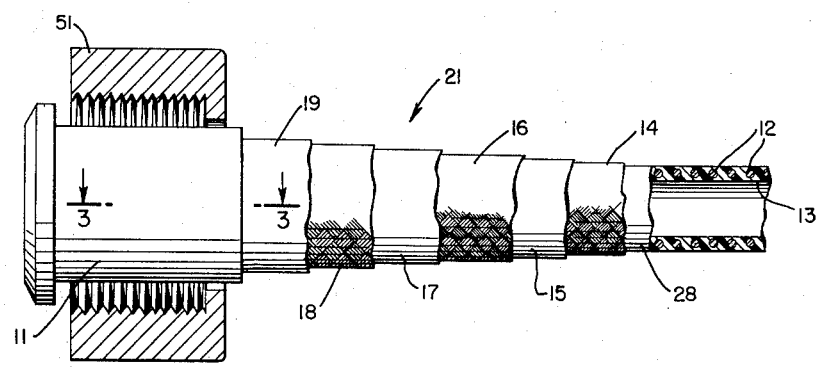
FIG. 2 is a fragmentary view in elevation, generally corresponding to the left hand portion of FIG. 1, of the conduit after an impregnating treatment in accordance with the invention.
Figure 3:
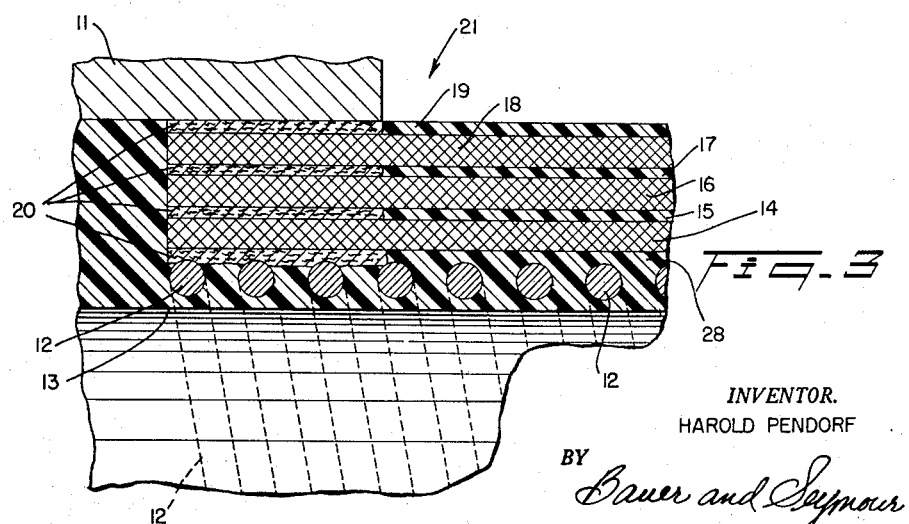
FIG. 3 is an enlarged fragmentary view in radial section through the conduit of FIG. 2, the section being taken along the line 3—3 of FIG. 2.

The novel conduit construction resulting from use of the apparatus of the invention will be more readily understood by a comparison of FIG. 1, wherein the assembled but unimpregnated conduit is designated 10, and FIG. 2, wherein the impregnated portion of the conduit shown is designated 21. As indicated in FIG. 1, the conduit comprises a plurality of superposed telescoped tubes or sleeves made of braided wire, three being shown in the illustrative embodiment. The innermost of such tubes is designated 14, the intermediate wire tube being designated 16, and the outermost wire tube being designated 18. The wire strands forming such tubes may be braided in a normal manner to make up the tubes, and may be constituted in various forms known to the art. In a preferred embodiment, each strand is made up of about eight small wires laid side by side to simulate a flat strip. The tubes may be braided separately and inserted into one another, or the larger diametered tubes may be braided directly on the smaller ones as a core. The smallest or inner tube is generally braided on a solid removable core, which, of course, has been removed from the illustrated conduit. Telescoped within braided tube 14 is a helically wound wire having closely spaced turns so that it, in effect, forms a fourth, innermost porous tube 12. The wire forming tube 12 is preferably made of a relatively stiff metal, such as stainless steel, so as to make the composite conduit wall markedly resistant to crushing forces.

The end portions of wire tubes 12, 14, 16 and 18 are firmly secured together by means of solder indicated at 20, and each said end is secured by means, such as solder also designated 20, within the sleeve of a flanged terminal fitting such as that shown at 11 at the left and 11' at the right in FIG. 1.

For the purpose of rendering the conduit moisture-proof, and at the same time to provide a smooth, non-chafing inner surface on the conduit to protect insulated wire passing therethrough against damage, the assembled conduit member 10, made up of superposed tubes 12, 14, 16 and 18, and, in the embodiment shown having terminal fittings 11, 11' connected thereto, is treated in a novel manner now to be described to provide therein a lining 13 and at the same time to provide thin layers 28, 15 and 17, of the lining material, respectively, between adjacent layers of the metal tubes making up the wall of the conduit. A thin coating 19 of such compound is preferably also disposed upon the outer surface of metal tube 18.

The layers 28, 15, 17 and 19 are integrally connected to each other and to lining 13 through the porous braiding of the intervening braided metal tubes and through the interstices between successive turns of wire tube 12, respectively. Besides forming a non-chafing lining on the conduit, the impregnating material also, in effect, locks the turns of wire of tube 12 against displacement longitudinally of the conduit.

In addition to its non-chafing properties, the material of which lining 13 and layers 28, 15, 17 and 19 is made should have good resistance to corona and should not contain volatiles for some uses. The lining material should be non-porous, flexible and resilient. When set, said material should retain these properties when subjected to a wide range of temperatures and exposed to grease, gasoline and moisture. A suitable material should also be tough and have the ability to conform to the braided metal tubing and withstand continual bending stresses. Elastomers, such as those having a polyvinylchloride base and silicone rubbers have been found suitable. One such silicone rubber or "silastic" compound is that sold under the trade name "Dow Silastic 132."

Another lining material which has been found suitable for use in flexible conduits for radio shielding aircraft engine ignition systems, for example, is a synthetic plastic material known in the trade as a "plastisol," i.e., a fluid dispersion of polyvinylchloride polymer in a plasticizer which may be converted by heat alone to an elastomeric vinyl compound. This material has a polyvinylchloride base with suitable plasticizers and a heat stabilizer. Suitable fillers may be used, if necessary, to vary the flow characteristics. A suitable composition consists of ten parts by weight of polyvinylchloride, such as "Geon #121," four parts of Rohm and Haas "Paraplex C–50," two parts of "Paraplex C–60" (a polyester) and two parts of a heat stabilizer consisting of a mixture of Paraplex C–50 and dibasic lead phthalate in equal parts. This material is prepared for application at normal room temperature. The Geon #121 should be in the form of a fine powder, the plasticizers (Paraplex) are added in liquid form, and the heat stabilizing mixture is added in finely powdered, well-mixed form. The ingredients are then mixed thoroughly, preferably under vacuum.

The impregnating compound such as silicone rubber or plastisol is applied to the above-described structure 10 (FIG. 1) in accordance with the novel method of the invention, one embodiment of which will now be described. Such method is conveniently carried out by use of the mold shown in FIGS. 4, 5, 6 and 7.

Such mold, which is generally designated 24, is of the longitudinally divided type having a lower half 25 and an upper half 26 which when assembled have an interface disposed longitudinally of the mold and along planes diametral of the two confronting semi-cylindrical mold cavity portions 27 and 29 in the respective mold halves. Such two mold cavity portions form a cylindrical mold cavity 23 having a diameter slightly greater than that of the outer braided tube 18 of conduit 10. Conduit 10 is disposed in the mold cavity in extended condition, being held in that condition and sealed at its ends to the mold cavity by means to be described and generally designated 30 at the left (FIG. 7) and 31 at the right.

Figure 7:
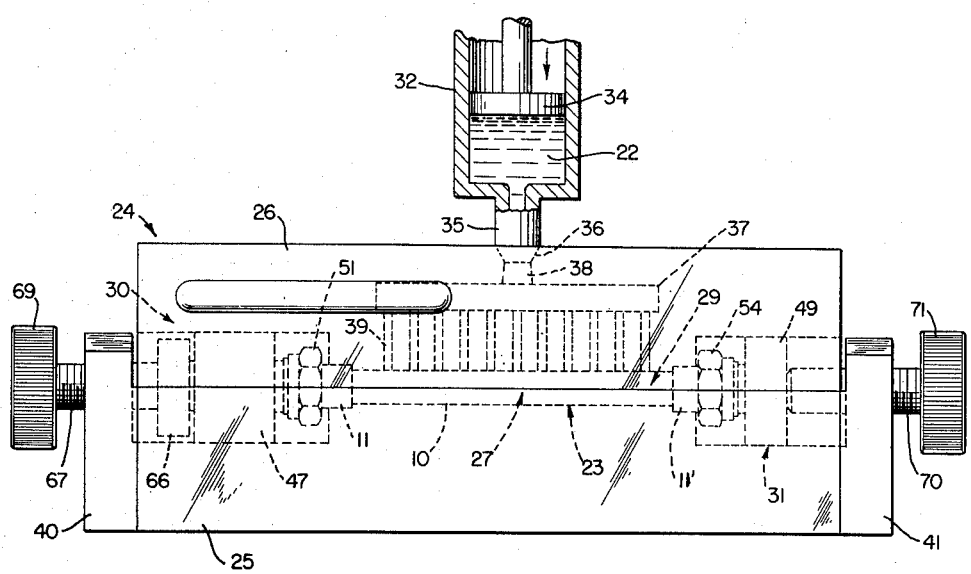
FIG. 7 is a view in elevation of the assembled mold, having a conduit to be treated contained therein, a portion of a compound-supplying injection device being shown cooperating with the mold.

When the mold has been assembled as shown in FIG. 7, with conduit 10 therewithin, it is then impregnated by a compound 22, such as those described above, supplied by an injection cylinder shown generally at 32. Cylinder 32 has a piston 34 which is thrust downwardly by mechanism, not shown, to deliver plastic material 22 outwardly of cylinder 32 through nozzle 35. The outer end of the nozzle is tapered, and is received in a similarly tapered opening 36 which is centrally located in the upper portion 26 of the mold above the conduit-receiving cavity portion 29 therein. The thus delivered plastic material 22 is forced inwardly to a central throat 38 and thence into a longitudinally disposed distributing channel 37 which lies centrally above and parallel to the mold cavity 23. A plurality of equally spaced vertical passages 39 connect the bottom of channel 37 with the top of the upper portion of the mold cavity, so that the plastic material 22 is delivered to the conduit within the mold cavity substantially simultaneously and at the same rate in zones spaced along a longitudinal extending area at one side of the conduit and thus tends to flow symmetrically down along the sides of the conduit and inwardly through the porous sidewall of the conduit.

The construction of the means whereby the ends of the conduit 10, including terminal fittings 11 and 11', are positioned in the mold cavity and sealed to the walls thereof will be more readily apparent on consideration of FIGS. 4 and 5. As there shown, the lower mold part 25 has an enlarged semi-cylindrical passage 42 at the left therein coaxial of mold cavity 27, and a similar enlarged semi-cylindrical passage 45 at the right end of such mold part. Upper mold part 26 is somewhat shorter than mold part 25, and is received between vertical end flanges 40 and 41 on the lower mold part. Mold part 26 has similar enlarged semi-cylindrical passages 44 and 46 confronting passages 42 and 45, respectively, in mold part 25. The enlarged cylindrical passages thus provided at the ends of the conduit-receiving mold cavity 23 have diameters such that they freely receive the nuts 51 and 54 disposed on sleeve members 11 and 11', respectively, of the two terminal members of the conduit (FIG. 1). A cylindrical block 47 is slidably mounted in the left enlarged passage in the mold, and a cylindrical block 49 is slidably mounted in the right enlarged passage in the mold. The slidable blocks 47 and 49 provide means whereby the conduit is suitably positioned within the mold cavity 23 and the terminal fittings on the conduit are sealed to the ends of the mold cavity. The conduit holding means includes an externally threaded hollow boss or nipple 50 disposed on the inner face of block 47 coaxial with the conduit-receiving cavity 23, and a similar hollow boss or nipple 52 disposed on the inner face of block 49. The outer ends of the conduit-receiving cavity 23 are provided with shallow counterbores which snugly receive, respectively, sleeve portions 11 and 11' of the two terminal fittings on the conduit. Mold part 25 is provided with left and right shallow counterbore portions 55 and 57, and mold part 26 is provided with shallow counterbore portions 56 and 59, such counterbore portions cooperating to form the aforesaid counterbores receiving the sleeve portions of the terminal fittings on the conduit.

The thus formed counterbores have transverse shoulders at their inner ends adapted to be engaged by the inner ends of the sleeves of the terminal fittings when the parts are disposed as shown in FIG. 5.

It is desirable that only so much of compound 22 be injected into the mold as is necessary to form the layers 13, 28, 15, 17 and 19 and to impregnate and fill the voids in the porous metal tubes forming the conduit wall. This avoids the necessity of draining excess compound from the central passage in the treated conduit. It is also desirable that the inner surface of lining layer 13 of the compound be substantially uniform in the thickness. Thus, in the embodiment of the mold shown, there is provided a mandrel 60 which is disposed within the conduit 10 in the mold coaxially of the wall of mold cavity 23.

Figure 6:
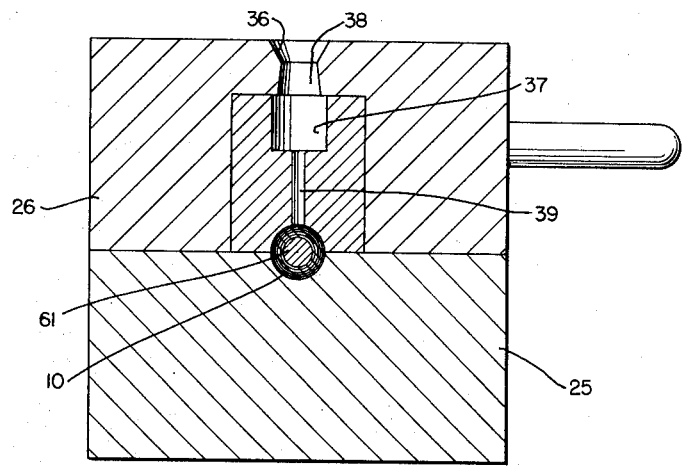
FIG. 6 is a fragmentary view in vertical section through the mold and a conduit positioned therein, the section being taken generally along the line 6—6 of FIG. 5.

The mandrel and the means for mounting it are shown most clearly in FIGS. 5 and 6. As shown, mandrel 60 has a circular cylindrical portion 61, at the left in FIG. 5, and a portion 62 of frusto-conical shape having the surface at its left hand, larger end merging smoothly with that at the right of portion 61. The left hand end of the mandrel is rotatably supported coaxial of mold cavity 23 in a journal 64 in block 47, the right hand, free end or nose of the mandrel being supported in a central guiding bore 65 in block 49. The mandrel projects through block 47, and is provided outwardly of the block with a knob 66 whereby it may be rotated about its axis to free it from lining layer 13 of the impregnating compound after the conduit has been impregnated.

A jack screw 67 is threaded into an opening in vertical flange member 40, screw 67 lying coaxial of the mandrel. A similar jack screw 70 is threaded into an opening in vertical flange 41 and is also located coaxial of the mandrel. The screws 67 and 70 may be rotated by knobs 69 and 71, respectively, to advance the inner ends of the screws to contact knob 66 and block 49, respectively, whereby to advance blocks 47 and 49 toward the ends of the mold cavity 23 or to retract the screws to allow the blocks to be moved away from each other.

The conduit 10 is impregnated as follows. It will be assumed that the conduit has been assembled as shown in FIG. 1, and that the parts thereof are clean and dry. The upper mold part 26 is removed from lower mold part 25, jack screws 67 and 70 are retracted somewhat, the block 47 with mandrel 60 mounted thereon, together with block 49 are lifted as a unit from bottom mold part 25, and block 47 is then moved away from block 49 to free the nose of the mandrel.

An untreated conduit 10 is then telescoped over the mandrel, and nut 51 of fitting 11 is screwed home on threaded nipple 50. The free end of mandrel 60 is thereafter inserted into bore 65 in block 49, and nut 54 is then screwed home on threaded nipple 52. The blocks 47 and 49, mandrel 60, and conduit 10, now assembled as a unit, are lowered into place in the cavity in lower mold half 25 so that the conduit lies in mold cavity portion 27, the sleeve portions of the terminal fittings lie in the respective counterbores at the ends of the mold cavity, and the assembled nuts 51 and 54 and blocks 47 and 49 lie within enlarged cavity portions 42 and 45 of the lower mold half. The upper mold half 26 is then assembled upon the lower mold half, and jack screws 67 and 70 are advanced to thrust the end surfaces of nuts 51 and 54 toward the respective inner confronting end of enlarged cavities 42 and 45. The snug reception of the sleeve portions of the terminal fittings 11 and 11' in the shallow counterbores at the ends of the mold cavity, the tight end engagement between the inner ends of sleeves 11 and 11' and the transverse shoulder at the inner ends of the counterbores receiving such sleeves, and/or the tight engagement between the end surfaces of the nuts 51 and 54 with the ends of the enlarged cavities substantially seal the ends of the conduit to the walls of the mold cavity.

Impregnating material 22 may now be introduced into the mold by presenting injection cylinder 32 thereto, as indicated in FIG. 7, and then thrusting piston 34 thereof downwardly until material 22 has filled the interstices or voids in the porous side walls of the conduit and has formed the layers 13, 28, 15, 17 and 19 of such impregnating compound. Because the compound is introduced to the outer wall of the conduit over an area disposed longitudinally of the conduit, and at substantially uniformly spaced zones in said area, pressure conditions, both of the impregnating compound and of the air which is displaced from the mold cavity and conduit wall in advance of the inflowing compound, are substantially symmetrical both longitudinally and laterally of the mold cavity. As a result there is little, if any, tendency for the inflowing compound to disturb the initial longitudinal spacing of the turns of wire making up inner tube 12.

After the conduit has been fully impregnated, the thrusting force is removed from piston 34, cylinder 32 is removed from cooperation with the mold, jack screws 67 and 70 are backed off, and the mold is opened. The diameter of vertical passages 39 in mold half 26 is preferably such that, taken with the viscosity of compound 22, flow of compound 22 ceases when piston 34 ceases to be thrust downwardly.

The assembly of blocks 47 and 49, the mandrel 60, and impregnated conduit 21 is then removed from mold half 25. Preferably the assembly is now given a pre-bake treatment with the mandrel in place within the conduit, to insure that the lining shall be of uniform thickness and shall have a smooth inner surface. Such pre-bake is conducted at a predetermined temperature and for a predetermined time, depending upon the character of the plastic material employed, to give such material a preliminary set. After the pre-bake, nut 51 is unscrewed from nipple 50, and blocks 47 and 49 are pulled away from each other, thereby withdrawing the mandrel from the conduit. Preferably the mandrel 60 is turned by knob 66 during this operation. Nut 54 may then be unscrewed from nipple 52 on block 49. The mold is then ready for treatment of another conduit 10.

The thus pre-baked conduit 21 is then transferred to a suitable oven and baked for a time and at a temperature, both suitable for the plastic material employed, to complete the setting and curing of the impregnating compound. The baked conduit is then removed from the oven and allowed to cool to room temperature, after which it is cleaned to remove excess impregnating compound therefrom as required.

Use of the apparatus of the present invention provides an improved moisture-proof radio shielding conduit of the type which has one or more layers of initially longitudinally displaceable components, such as the turns of a helically wound reinforcing wire locked in place in its sidewall structure, an improved simplified, reliable and effective method for fabricating such conduit, and a novel apparatus by which the method may be carried out. The novel apparatus makes it possible to make such conduits with assurance as to the uniformity and high quality of the finished product and to effect such fabrication rapidly and at low cost with a minimum waste of materials. The apparatus of the invention is simple, rugged, and easily operated. Such apparatus produces impregnated conduits which are substantially uniform throughout their extents, and also from conduit to conduit. The helically wound, initially axially displaceable component in the conduit sidewall is not substantially displaced, and the inner coating or lining 13 is generally smooth and of substantially uniform thickness.

Although only a single embodiment of the apparatus of the invention has been illustrated in the accompanying drawings and described in the foregoing specification, it is to be expressly understood that the invention is not limited thereto. For example, the apparatus may be shaped to treat conduits having a variety of shapes, the contour of the mold cavity and the shape of the mandrel being altered as required by the shape of the conduit to be treated. Various other changes may also be made, such as the specific materials, temperatures and the like suggested herein by way of example and in the design and arrangement of the parts illustrated without departing from the spirit and scope of the invention as the same will now be understood by those skilled in the art.

What is claimed is:

1. Apparatus adapted for lining and impregnating with a sluggish fluid compound the porous walls of a conduit having sleeve-like terminal fittings with flanges adjacent their outer ends, comprising a longitudinally divided mold having an elongated cavity formed between confronting parts of the mold, said cavity in its generally central part being in the form of a mold cavity receiving the conduit in extended condition, at portions thereof immediately outwardly of the mold cavity being in the form of counterbores of larger diameter than the mold cavity and of such diameter as snugly to receive the adjacent end portions of the sleeve-like terminal fittings on the conduit, and at its outer ends being in the form of passages of larger diameter than the counterbores and receiving the flanges of the terminal fittings on the conduit, the junctions between the mold cavity and the counterbores and the junctions between the counterbores and the passages being in the form of generally transverse annular shoulders, the sleeves on the terminal fittings lying within the counterbores and having generally transverse inner end surfaces overlying the shoulders at the opposite ends of the mold cavity, a block beyond each end of the mold cavity, each block being supported in and guided by the respective passage for movement toward and away from the respective end of the mold cavity and for easy removal from the passage, means for detachably securing each respective terminal fitting and its block together in the form of an assembly, each assembly having a generally transverse annular shoulder, each said last named annular shoulder closely confronting the junction between the counterbore and the respective passage in the mold, each block having an inwardly facing abutment surface thereon engaging the outer face of the respective terminal fitting when the block and fitting are in assembled relationship, means mounted on the mold for thrusting each of the assemblies toward the mold cavity so as forcibly to thrust at least one of the inner end surfaces of the sleeve and the last named annular shoulder of the assembly into sealing engagement with the inner end of the respective counterbore and the junction between the respective counterbore and the passage, respectively, and means in the mold for introducing the compound under pressure to the outer surface of the conduit over an area disposed generally longitudinally of the conduit, whereby the conduit and blocks may be inserted and removed from said cavity as a conduit-block assembly when the mold sections are separated.

2. Apparatus as defined in claim 1, comprising a mandrel extending through and having a close moving fit within one of said blocks and adapted to be received within and to extend through the conduit and the terminal fittings thereon, a recess in the other of said blocks for journalling the other end of the mandrel which protrudes beyond the respective terminal fitting, and means on the mandrel for rotating the mandrel, whereby the mandrel forms part of said removable conduit-block assembly.

3. Apparatus as defined in claim 1 wherein the conduit has axially outwardly facing nuts on the terminal fittings inwardly of the flanges on such fittings, said passages in the mold receive the nuts on the respective terminal fittings, and said blocks have threaded bosses aligned with the ends of the mold cavity and threadedly receiving the nuts on the respective terminal fittings, comprising upstanding plate-like members attached to the ends of one of the mold parts and at least partially overlapping the other of the mold parts when the mold parts are together in confronting operative position, and wherein the means for thrusting the blocks toward the mold cavity comprise screws threaded into the plate-like means, extending axially of the mold cavity, and abutting the outer ends of the respective assemblies.

References Cited in the file of this patent

UNITED STATES PATENTS

| | | |
|---|---|---|
| 1,366,342 | Atwood | Jan. 25, 1921 |
| 1,964,202 | Hooper | June 26, 1934 |
| 2,364,911 | Osella | Dec. 12, 1944 |
| 2,501,863 | Cox | Mar. 28, 1950 |
| 2,759,864 | Kuebler | Aug. 21, 1956 |

FOREIGN PATENTS

| | | |
|---|---|---|
| 374,842 | Great Britain | June 2, 1932 |